(12) United States Patent
Sköldström et al.

(10) Patent No.: US 12,254,025 B2
(45) Date of Patent: Mar. 18, 2025

(54) SYNCHRONIZING CONFLICT-FREE REPLICATED DATA TYPES

(71) Applicant: Telefonaktiebolaget LM Ericsson (publ), Stockholm (SE)

(72) Inventors: Pontus Sköldström, Solna (SE); Amardeep Mehta, Solna (SE); Mina Sedaghat, Solna (SE); Vinay Yadhav, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 278 days.

(21) Appl. No.: 18/014,765

(22) PCT Filed: Jul. 8, 2020

(86) PCT No.: PCT/SE2020/000020
§ 371 (c)(1),
(2) Date: Jan. 6, 2023

(87) PCT Pub. No.: WO2022/010388
PCT Pub. Date: Jan. 13, 2022

(65) Prior Publication Data
US 2023/0297588 A1 Sep. 21, 2023

(51) Int. Cl.
*G06F 16/27* (2019.01)
*G06F 16/23* (2019.01)
(52) U.S. Cl.
CPC .......... *G06F 16/27* (2019.01); *G06F 16/2365* (2019.01)

(58) Field of Classification Search
None
See application file for complete search history.

(56) References Cited

U.S. PATENT DOCUMENTS

2017/0024451 A1 1/2017 Sullivan
2022/0391381 A1* 12/2022 Thimbleby ........... G06F 16/275

FOREIGN PATENT DOCUMENTS

CN 106792781 A 5/2017
CN 110569267 A 12/2019

OTHER PUBLICATIONS

Almeida, et al., "Efficient State-based CRDTs by Delta-Mutation," Networked Systems, Lecture Notes in Computer Science, vol. 9466, Oct. 2014, 18 pages.
Baquero, et al., "Making Operation-Based CRDTs Operation-Based," Distributed Applications and Interoperable Systems, vol. 8460, Lecture Notes in Computer Science, 2014, pp. 126-140.
Deftu, et al., "A Scalable Conflict-Free Replicated Set Data Type," International Conference on Distributed Computing Systems, Philadelphia, Pennsylvania, 2013, IEEE Computer Society, pp. 186-195.
Enes, et al., "Efficient Synchronization of State-based CRDTs," 35th International Conference on Data Engineering, 2019, Macao, China, 13 pages.

(Continued)

*Primary Examiner* — Eddy Cheung
(74) *Attorney, Agent, or Firm* — Withrow & Terranova, PLLC (57) ABSTRACT

The present disclosure relates to a method of a device of communicating data states of a Conflict-free Replicated Data Type (CRDT) structure over a plurality of other devices in a network of devices.

13 Claims, 5 Drawing Sheets

(56) References Cited

OTHER PUBLICATIONS

Shapiro, et al., "Conflict-free Replicated Data Types," Lecture Notes in Computer Science, vol. 6976, 2011, Springer, 18 pages.
International Search Report and Written Opinion for International Patent Application No. PCT/SE2020/000020, mailed Apr. 26, 2021, 13 pages.

* cited by examiner

SYNCHRONIZING CONFLICT-FREE REPLICATED DATA TYPES

This application is a 35 U.S.C. § 371 national phase filing of International Application No. PCT/SE2020/000020, filed Jul. 8, 2020, the disclosure of which is incorporated herein by reference in its entirety.

TECHNICAL FIELD

The present disclosure relates to a method of a device of communicating data states of a Conflict-free Replicated Data Type (CRDT) structure over a plurality of other devices in a network of devices, and a device performing the method.

BACKGROUND

Edge computing is a form of distributed cloud computing which aims to bring the computing power closer to the data source and/or user. In an edge environment, the data is often generated and processed by multiple data sources in multiple geographical locations and stored in replicated databases in different edge clouds.

For instance, a vehicle such as an autonomous car exchanges data with a fleet of other autonomous cars, for instance for collectively updating a road sign or just for exchanging useful operative vehicle data. Thus, cars may need access to data hosted by other cars. In other words, one car may require replicas of the data hosted by another car such that updating and processing of data is based on a most current data set, and one car may modify data shared between multiple cars where each car has a replica of the shared data.

The geographical distribution of the edge clouds, and mobility of the data sources/users raises challenges on how to propagate, aggregate, and to ensure consistency of the distributed data replicas, especially when considering network latencies and bandwidth constraints between edge nodes, and particularly in the event of network partitioning. The current distributed databases are typically not meant for geo-distributed data handling, as they are sensitive to network latency and partitions.

SUMMARY

An objective is to solve, or at least mitigate, this problem in the art and thus to provide a method of a device of communicating data states of a CRDT structure over a plurality of other devices in a network of devices.

This objective is attained in a first aspect by a method of a first device of communicating data states of a Conflict-free Replicated Data Type (CRDT) structure over a plurality of other devices in a network of devices, the first device performing operation-based synchronization operations, which network of devices comprising at least one second device performing operation-based synchronization operations and at least one third device performing state-based synchronization operations. The method comprises updating an intermediate data state being in common with said at least one second device performing operation-based synchronization operations, said common intermediate data state representing individual data states of the devices performing operation-based synchronization operations, performing a computation updating a current data state and the common intermediate data state of the first device, multicasting an indication of the computation being performed to said at least one second device performing operation-based synchronization operations, and multicasting the updated data state, where the intermediate data state replaces the individual data states of the devices performing operation-based synchronization operations, to said at least one third device performing state-based synchronization operations, thereby synchronizing the data state of the first device with the data states of the at least one second device performing operation-based synchronization operations and at least one third device performing state-based synchronization operations.

This objective is attained in a second aspect by a first device configured to communicate data states of a CRDT structure over a plurality of other devices in a network of devices, the first device performing operation-based synchronization operations, which network of devices comprising at least one second device performing operation-based synchronization operations and at least one third device performing state-based synchronization operations, the first device comprising a processing unit and a memory, said memory containing instructions executable by said processing unit, whereby the first device is operative to update an intermediate data state being in common with said at least one second device performing operation-based synchronization operations, said common intermediate data state representing individual data states of the devices performing operation-based synchronization operations, perform a computation updating a current data state and the common intermediate data state of the first device, multicast an indication of the computation being performed to said at least one second device performing operation-based synchronization operations, and to multicast the updated data state, where the intermediate data state replaces the individual data states of the devices performing operation-based synchronization operations, to said at least one third device performing state-based synchronization operations, thereby synchronizing the data state of the first device with the data states of the at least one second device performing operation-based synchronization operations and at least one third device performing state-based synchronization operations.

In the art, it is not possible to directly translate an operation-based CRDT to its state-based counterpart. For instance, for a state-based grow-only counter, it is easy to convert to its operation-based counterpart by determining the data value (by summing the individual node states) and setting that as the data state/value. However, there is no way to convert the operations-based implementation to a state-based implementation, by translating the single state/value in the operation-based implementation to a list of individual node data states. By introducing the intermediate data state being in common for the devices performing operation-based synchronization operations, it is advantageously possible to "translate" an operation-based synchronization operation to a state-based synchronization operation, such that the updated data state can communicated to a device utilizing state-based synchronization.

In an embodiment, the first device receives any data state update from said at least one third device performing state-based synchronization operation and updates the current data state of the first device by performing a merging operation with said received any data state update.

In an embodiment, the first device receives any data state update from said at least one second device performing operation-based synchronization operation and updating the current data state and the common intermediate data state of the first device by performing the computation being indicated with the received data state update.

In an embodiment, the first device updates the intermediate data state by summing the individual data states of all the devices performing operation-based synchronization operations.

In an embodiment, the first device computes a data value being a sum of all individual states of the current data state.

In an embodiment, the first device categorizes other devices to be engaged in the communication of data states on a basis of which synchronization operation said other devices are expected to perform on the data states.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
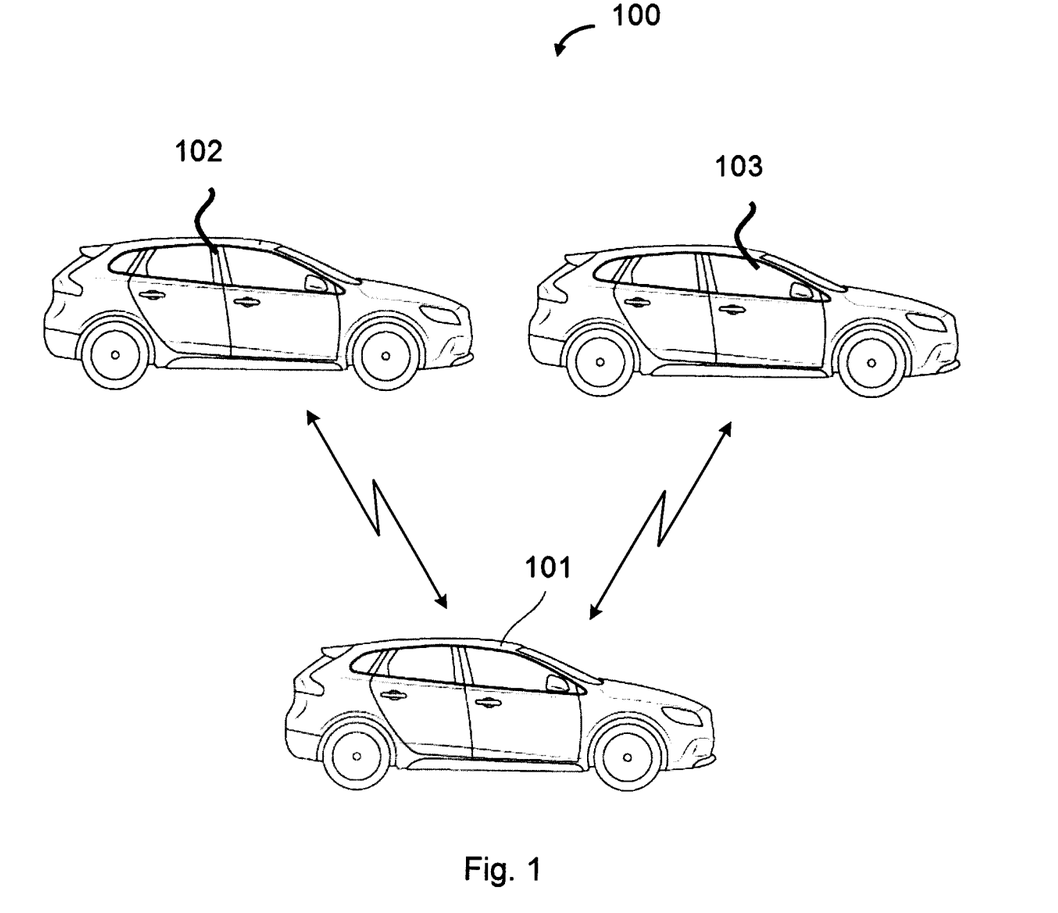
FIG. 1 illustrates a wireless communications network loci in which embodiments may be implemented.

FIG. 1 illustrates a wireless communications network 100 as previously discussed, where a first autonomous car 101 exchanges data—such as control, positional, maintenance and/or operational data—with a second autonomous car 102 and a third autonomous car 103. The third car 103 may require access to data hosted by the first car 101 and the second car 102 for instance for collectively updating a road sign. Thus, data must be synchronized between the three autonomous vehicles 101, 102, 103. Further, the communication must be rapid in case of autonomous car control, since the car 101 needs to react immediately, for instance for activating the brakes, upon receiving data from the second and third vehicle 102, 103.

In other words, the third car 103 may require replicas of the data hosted by second car 102 and the first car 101. Thus, the data residing at the three nodes must be in synchronization.

Conflict-free Replicated Data Types (CRDTs) is a data structure which provides strong eventual consistency in a scalable manner that does not require any consensus or coordination between all involved nodes, which nodes with reference to FIG. 1 could constitute the first car 101, the second car 102 and the third car 103. The CRDT data can be replicated across multiple nodes/computers in a network, where the replicas can be updated independently and concurrently without coordination between the replicas. This makes CRDT-based solutions more scalable and resistant to failures, suitable mechanisms for providing strong eventual consistency in a geo-distributed environment such as the edge.

Synchronizations of CRDTs can be classified into two main categories: state-based and operation-based. Each of these synchronization methods are suitable for a specific scenario or application behaviour.

However, there is currently no way of dynamically switching between the two synchronization methods, since different CRDT synchronization methods are using fundamentally different data structures and computations to produce a common data value.

To be able to dynamically use and switch multiple CRDT synchronization methods within an environment, such as the wireless communication network 100 of FIG. 1, where different instances of an application may have different behaviour, a system is required which is capable of translating one CRDT structure to another and enable interoperability between different synchronization methods.

Figure 2:
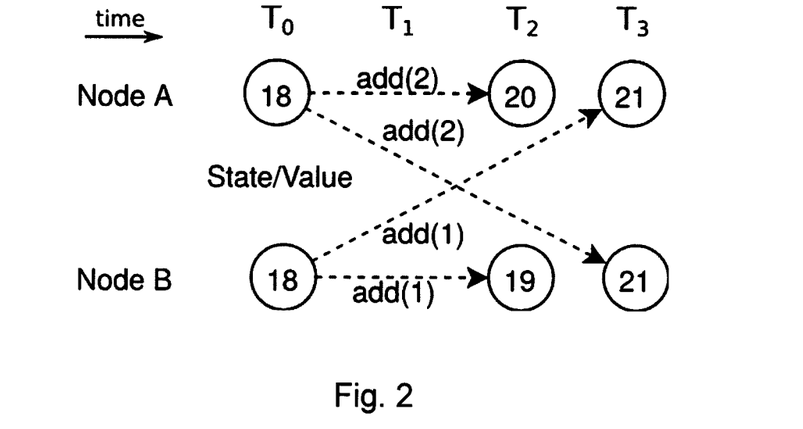
FIG. 2 illustrates operation-based CRDTs.

FIG. 2 illustrates operation based CRDTs where an indication of the operation to be performed during computation of data values or states are sent between Node A and Node B (embodied for instance by the first car 101 and the second car 102) to maintain synchronization. The shared, eventually consistent, value in this example is the state/value itself. It is noted that for operation based CRDTs, the data state and the data value is the same, so these terms are interchangeably used to refer to the same element.

As is shown, Node A and Node B both computes a data state "18" at time $T_o$. Thereafter the operation "add(2)" is performed by Node A at $T_o$ resulting in a data state of "20" at $T_2$. Simultaneously, the operation "add(1)" is performed by Node B at $T_o$ resulting in a data state of "19" at $T_2$. Further at $T_o$, Node A transfers an indication to Node B of the operation to be performed ("add(2)") to the data state "19" at $T_3$, while Node B transfers an indication to Node A of the operation to be performed ("add(1)") to the data state "20" at $T_3$. resulting in the data states ("21") being in synchronization at $T_3$. The up-to-date and synchronized data state, i.e. the final data replica, which may be communicated to further nodes is thus the data state "21".

An advantage of operation based CRDTs is that relatively small messages (i.e. an indication of the operation to be performed) are sent over the network; and applied to the local data replica, A disadvantage of operation-based CRDTs is that to allow a new node to enter the network, each node must have access to the entire set of operations and communicate those through the network. This requires an ever-growing amount of local storage and the substantial time it takes to apply all the operations to a data state in order to attain a new data replica. Further, each operation must be delivered exactly once and, for some CRDTs, some messages must be delivered in order. This poses some constraints on the network protocol used to transport the updates.

Figure 3:
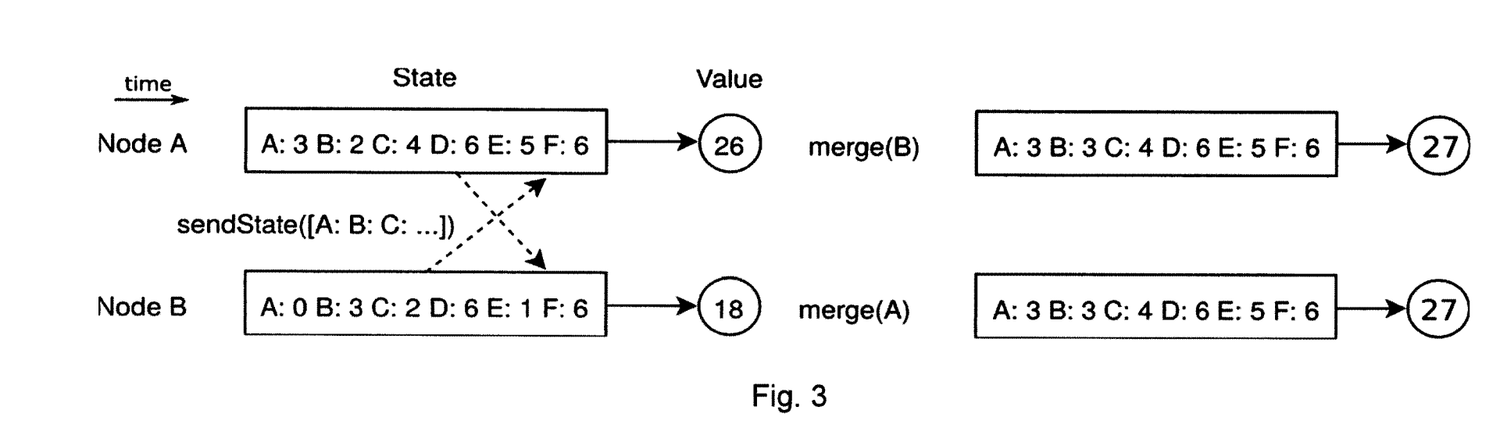
FIG. 3 illustrates state-based CRDTs.

FIG. 3 illustrates state-based CRDTs, which replicates the entire state in each message and providing a merge function that merges two states (the remote state and the local state) into a new state that includes both. The shared, eventually consistent, data value in this example is the sum of each individual node contribution, i.e. the sum of the individual states in the state vector.

As is shown, Node A computes a sum of its state vector resulting in data value "26", while Node B computes a sum of its state vector resulting in data value "18". The state vectors are then exchanged between Node A and Node B and merged at the respective node, resulting in two identical state vectors, which when summed results in a final data value "27" for both nodes.

An advantage of state-based CRDTs is that no reliable causally ordered delivery mechanism is required (contrary to the operation-based approach). If the state of a certain node has not been propagated, it will eventually be propagated in the future. In other words, message loss or reordering is not a problem.

A disadvantage is that relatively large messages are sent over the network as the size of the state grows. and further that the time to apply the updates (i.e. executing the merge function) becomes greater for larger states.

Figure 4:
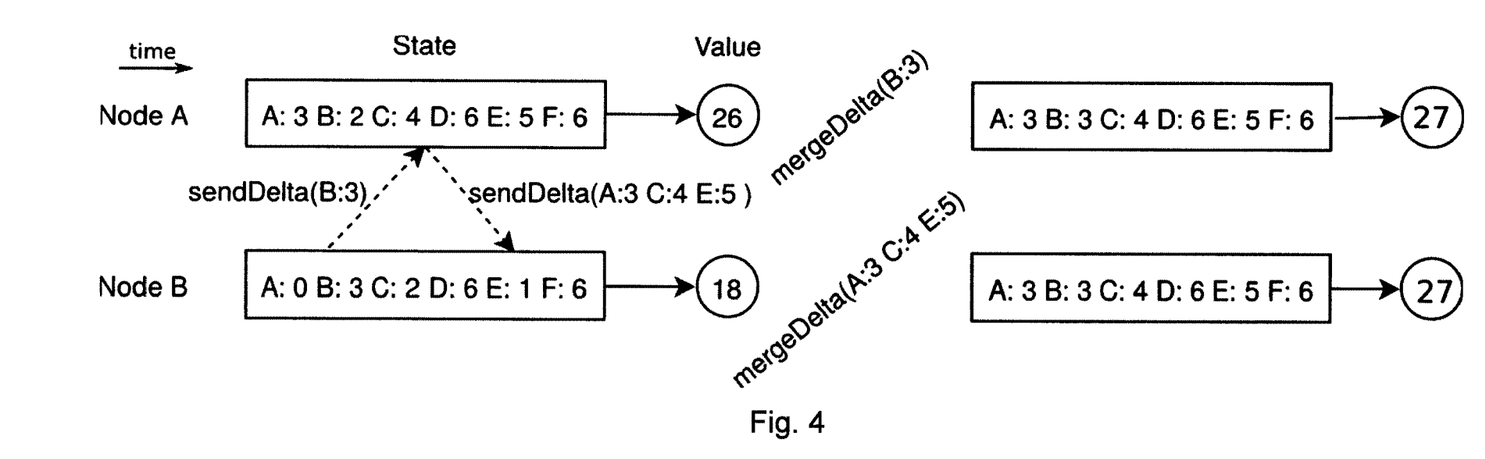
FIG. 4 illustrates delta-state CRDTs.

FIG. 4 illustrates delta-state CRDTs, which form a subclass of the state-based CRDTs capable of reducing message size for transporting updates, as only changes ("delta") to the state is transmitted. In case of changes to large sections of the state, the size of the message is similar to the state-based approach. Like in the case of state-based CRDT, the shared, eventually consistent value is the data value formed by summing the individual values of the state vector.

As is shown, Node A computes a sum of its state vector resulting in data value "26", while Node B computes a sum of its state vector resulting in data value "18". Node A sends the values of its state vector which differs from the corresponding values of the state vector of Node B (in this example values A, C and E), while Node B sends the values of its state vector which differs from the corresponding values of the state vector of Node A (in this example value B).

The state vector of the respective node is then merged with the received delta(s) from the other node, resulting in two identical state vectors, which when summed results in a final data value "27" for both nodes.

Advantages of delta-state CRDTs include smaller messages being transmitted compared to state-based CRDT and further there is no need for a reliable delivery mechanism, compared to operation-based CRDT. On the other hand, a disadvantage is that in highly mutable and dynamic environments, with high update rates, the delta-state approach does not help much as the size of delta is often large. Further, some amount of additional memory is needed to track the neighbour's state changes, in order to calculate the delta.

In practice, it would be desirable to take advantage of the different synchronization methods in different scenarios. For example, an application with multiple data replicas distributed geographically, when different data replicas have different connectivity, or different data replicas have different update behaviour. In such a scenario, operation-based synchronization is preferred among nodes with frequent updates, and state- or delta-state updates are preferred for nodes with less frequent updates but which are more likely to lose connectivity, or have messages duplicated. However, ultimately, all the replicas of the application should converge to a single common consistent value, regardless of the synchronization method utilized.

Figure 5:
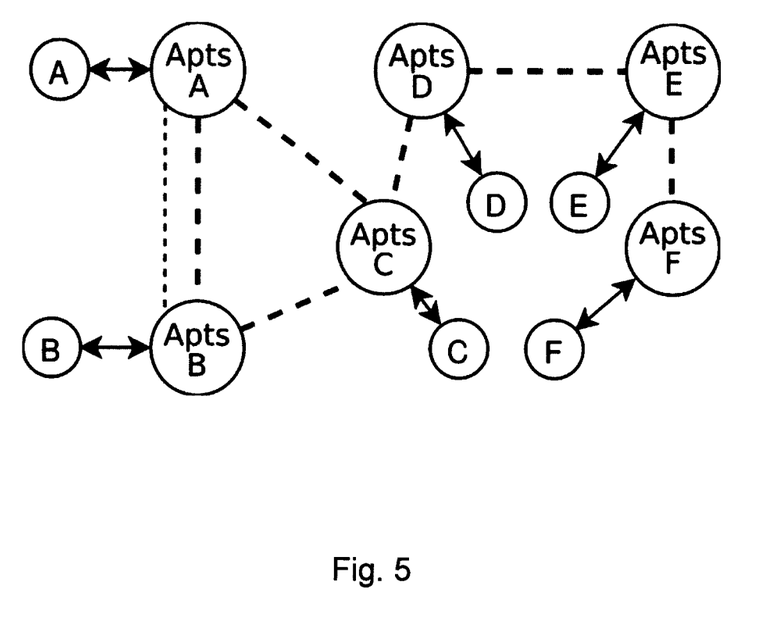
FIG. 5 illustrates an example scenario, where all nodes synchronize using state-based synchronization, but Node A and B also synchronize using operation-based synchronization.

FIG. 5 illustrates an example scenario, where all nodes synchronize using state-based synchronization, but node A and B also synchronize using operation-based synchronization. A processing unit in each node, referred to as an apparatus (i.e. Apts A for node A, Apts B for node B, and so on) is responsible for translating the data structures and doing required calculations to enable interoperable state exchanges between the nodes with different synchronization methods. In practice, the apparatus arranged in each node is embodied in the form of for example a microprocessor, a digital signal processor (DSP), an application specific integrated circuit (ASIC), etc.

However, it is not possible to directly translate an operation-based CRDT to its state-based counterpart. For instance, for a state-based grow-only counter, it is easy to convert to its operation-based counterpart by determining the data value (by summing the individual node states) and setting that as the state/value. However, there is no way to convert the operations-based implementation to a state-based implementation, by translating the single state/value in the operation-based implementation to a list of individual node data states.

Therefore, embodiments disclosed herein proposes nodes which:
provide a common interface towards other nodes regardless of synchronization mechanism (operation, state, delta-state), and
allows the same CRDT data structures to be synchronized using different mechanisms to different nodes, e.g. depending on memory constraints, networks constraints, and timing constraints.

Figure 6:
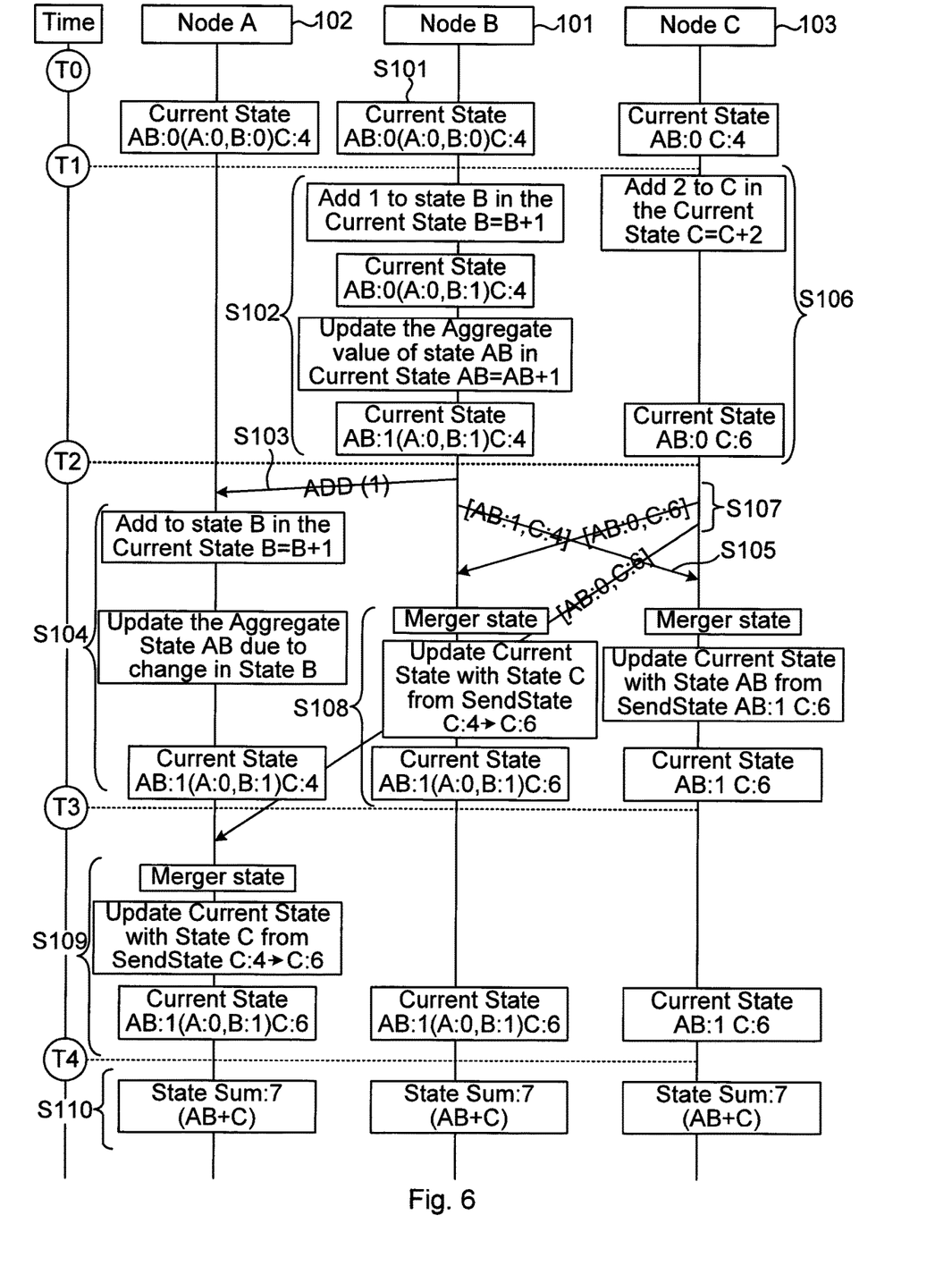
FIG. 6 shows a timing diagram illustrating communication between nodes over which CRDT data states are synchronized according to an embodiment.

FIG. 6 shows a timing diagram illustrating communication between nodes over which the CRDT data states are synchronized according to an embodiment.

Before communication proceeds among the nodes, the node initializing the synchronization, in this exemplifying embodiment Node B (i.e. a device such as for instance vehicle 101 of FIG. 1 or a mobile communication terminal), will determine which CDRT synchronization operations are to be performed on the data states to be communicated among the nodes.

Node B will thus categorize the nodes on a basis of which synchronization operation the nodes are expected to perform on the data states. In this case, Node A and Node B will perform an operation-based synchronization operation while Node C will perform a state-based synchronization operation.

A current state vector for each respective node is illustrated at time $T_o$, where the state for Node A is A:0, the state of Node B is B:0 and the state for node C is C:4. That is, each node—in this example Node A, Node B and Node C—holds a CRDT data state which may or may not be in synch with the current state of the other nodes. For brevity only Node A, Node B and Node C is engaged in the communication, and not Node D, Node E and node F (as shown in FIG. 5).

Further, after having categorized Node A as performing an operation-based synchronization operation, node B will in step S101 (since Node A is in the same category as Node B) update an intermediate data state—AB:0—being in common with other nodes of the same category, i.e. Node A. In this example, the intermediate data state AB represents the sum of the individual data state values of all the operation-based nodes.

The common intermediate data state represents individual data states of the nodes (i.e. Node A and Node B) performing operation-based synchronization operations.

At $T_1$ in step S102, Node B performs an operation of adding 1 to its current state, resulting in B:1, updates the intermediate data state AB accordingly (resulting in AB:1, C:4) and communicates in step S103 at $T_2$ an indication of the operation to be performed to Node A, i.e. add(1), which in its turn updates its local intermediate data state AB in step S104 to attain the value AB:1 in order to keep the data states of Node A and Node B in synchronization. The current data state vector held by node A and Node B is thus AB:1, C:4. It is noted that if further nodes would be included in the operation-based category, Node B would multicast the add (1) indication to all these nodes.

Further at $T_2$, Node B, multicasts in step S105 the current data state (i.e. the intermediate state AB:1 and C:4) to the state-based nodes, i.e. in this case to Node C to provide synchronization.

Additionally at $T_1$, Node C adds 2 to its local state C and updates in step S106 its local state to C:6, resulting in a local current state AB:0, C:6, and multicasts in step S107 at $T_2$ its current data state to Node A and Node B being in the operation-based category, in order to keep its data state in synchronization with the data states of Node A and Node B, respectively.

At $T_2$, after Node B and Node C have exchanged the required data states, Node B and Node C perform a merge operation in step S108 having as an effect that data state C:4 of Node B is updated to C:6, while data state AB:0 of Node C is updated to AB:1. The data states at Node B and node C are thus synchronized to AB:1, C:6.

At $T_3$, Node C performs in step S109 the same merging operation just performed at Node B using the updated information received from Node C in step S107. That is, data state C is updated at Node C from C:4 to C:6.

Advantageously, as can be seen in FIG. 6, at $T_4$, the data states of the nodes are synchronized, i.e. AB:1, C:6, even though some nodes involved in the synchronization uses operation-based synchronization while another node uses state-based synchronization.

Finally, after the data states of the nodes have been synchronized at $T_4$, a sum of all individual states may be computed in step S110 at each node, resulting in a value of "7" (if computed for Node A, Node B and Node C).

Advantageously, the nodes are enabled to combine and take advantage of the different aspects of CRDT synchronization, allowing nodes to optimize the exchange of data for different goals in different parts of the network, for instance:
- reduce data update latency and message size between certain nodes by selecting operations-based synchronization;
- place less requirements on the network and reduce the number of messages between certain nodes by selecting state or delta-state updates of the data states; and
- reducing memory consumption in certain nodes by selecting state-based rather than delta-state based synchronization.

Figure 7:
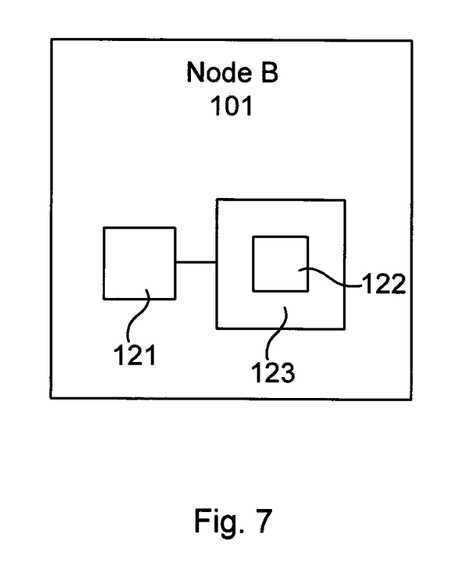
FIG. 7 illustrates a device (Node B) configured to communicate data states of a CRDT structure over a plurality of other devices in a network of devices according to an embodiment.

FIG. 7 illustrates a device (corresponding to Node B) configured to communicate data states of a CRDT structure over a plurality of other devices in a network of devices. The steps of the method performed by the device 101 are in practice performed by a processing unit 121 embodied in the form of one or more microprocessors arranged to execute a computer program 122 downloaded to a suitable storage volatile medium 123 associated with the microprocessor, such as a Random Access Memory (RAM), or a non-volatile storage medium such as a Flash memory or a hard disk drive. The processing unit 121 is arranged to cause the device 101 to carry out the method according to embodiments when the appropriate computer program 122 comprising computer-executable instructions is downloaded to the storage medium 123 and executed by the processing unit 121. The storage medium 123 may also be a computer program product comprising the computer program 122. Alternatively, the computer program 122 may be transferred to the storage medium 123 by means of a suitable computer program product, such as a Digital Versatile Disc (DVD) or a memory stick. As a further alternative, the computer program 122 may be downloaded to the storage medium 123 over a network. The processing unit 121 may alternatively be embodied in the form of a digital signal processor (DSP), an application specific integrated circuit (ASIC), a field-programmable gate array (FPGA), a complex programmable logic device (CPLD), etc.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of a first device of communicating data states of a Conflict-free Replicated Data Type, CRDT, structure over a plurality of other devices in a network of devices, the first device performing operation-based synchronization operations, which network of devices comprising at least one second device performing operation-based synchronization operations and at least one third device performing state-based synchronization operations, comprising:
   updating an intermediate data state being in common with said at least one second device performing operation-based synchronization operations, said common intermediate data state representing individual data states of the devices performing operation-based synchronization operations;
   performing a computation updating a current data state and the common intermediate data state of the first device;
   multicasting an indication of the computation being performed to said at least one second device performing operation-based synchronization operations; and
   multicasting the updated data state, where the intermediate data state replaces the individual data states of the devices performing operation-based synchronization operations, to said at least one third device performing state-based synchronization operations, thereby synchronizing the data state of the first device with the data states of the at least one second device performing operation-based synchronization operations and at least one third device performing state-based synchronization operations.

2. The method of claim 1, further comprising:
receiving any data state update from said at least one third device performing state-based synchronization operation and updating the current data state of the first device by performing a merging operation with said received any data state update.

3. The method of claim 1, further comprising:
receiving any data state update from said at least one second device performing operation-based synchronization operation and updating the current data state and the common intermediate data state of the first device by performing the computation being indicated with the received data state update.

4. The method of claim 1, the updating of the intermediate data state comprising:
summing the individual data states of all the devices performing operation-based synchronization operations.

5. The method of claim 1, further comprising:
computing a data value by summing all individual states of the current data state.

6. The method of claim 1, further comprising:
categorizing other devices to be engaged in the communication of data states on a basis of which synchronization operation said other devices are expected to perform on the data states.

7. A first device configured to communicate data states of a Conflict-free Replicated Data Type, CRDT, structure over a plurality of other devices in a network of devices, the first device performing operation-based synchronization operations, which network of devices comprising at least one second device performing operation-based synchronization operations and at least one third device performing state-based synchronization operations, the first device comprising a processing unit and a memory, said memory containing instructions executable by said processing unit, whereby the first device is operative to:
update an intermediate data state being in common with said at least one second device performing operation-based synchronization operations, said common intermediate data state representing individual data states of the devices performing operation-based synchronization operations;
perform a computation updating a current data state and the common intermediate data state of the first device;
multicast an indication of the computation being performed to said at least one second device performing operation-based synchronization operations; and
multicast the updated data state, where the intermediate data state replaces the individual data states of the devices performing operation-based synchronization operations, to said at least one third device performing state-based synchronization operations, thereby synchronizing the data state of the first device with the data states of the at least one second device performing operation-based synchronization operations and at least one third device performing state-based synchronization operations.

8. The first device of claim 7, further being operative to:
receive any data state update from said at least one third device performing state-based synchronization operation and update the current data state of the first device by performing a merging operation with said received any data state update.

9. The first device of claim 7, further being operative to:
receive any data state update from said at least one second device performing operation-based synchronization operation and update the current data state and the common intermediate data state of the first device by performing the computation being indicated with the received data state update.

10. The first device of claim 7, further being operative to, when updating the intermediate data state:
sum the individual data states of all the devices performing operation-based synchronization operations.

11. The first device of claim 7, further being operative to:
compute a data value by summing all individual states of the current data state.

12. The first device of claim 7, further being operative to:
categorize other devices to be engaged in the communication of data states on a basis of which synchronization operation said other devices are expected to perform on the data states.

13. The first device of claim 7, the first device being a wireless communication terminal or a vehicle being connected to a wireless communications network.

* * * * *